May 12, 1931.  M. R. JEFFREY  1,804,989
FISH CONTROL APPARATUS
Filed March 6, 1930    2 Sheets-Sheet 2
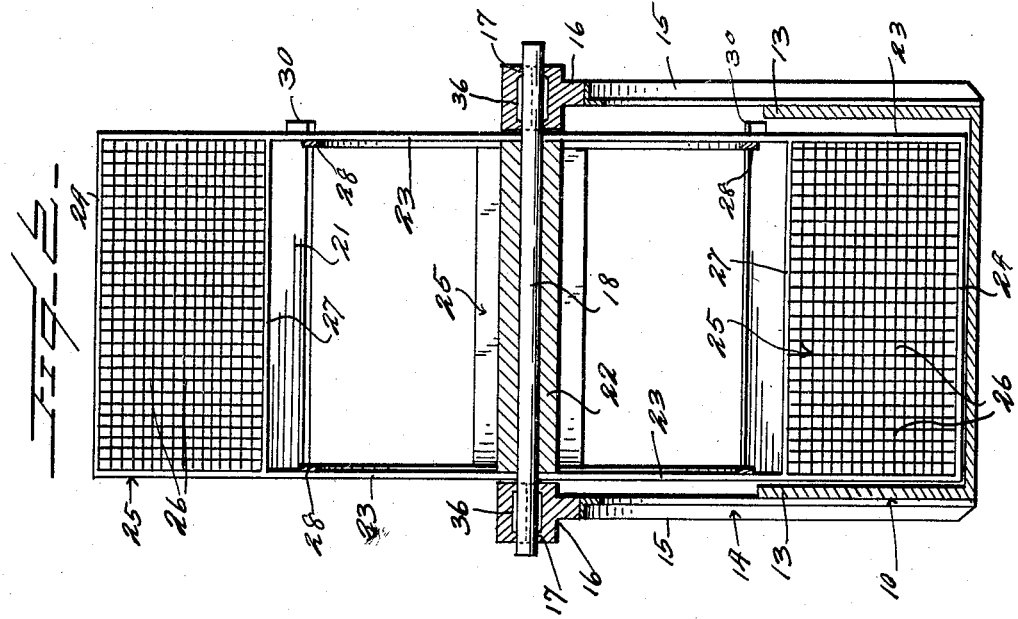
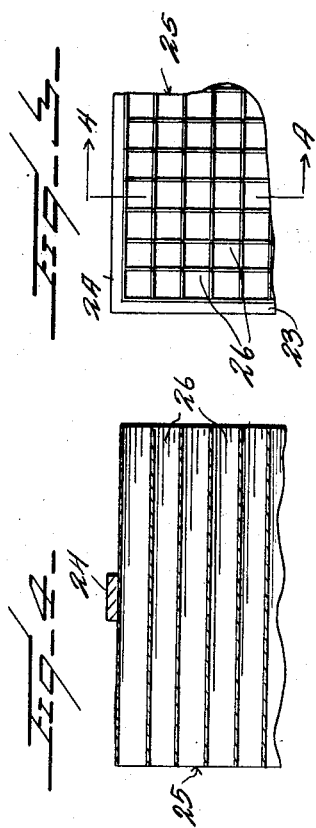
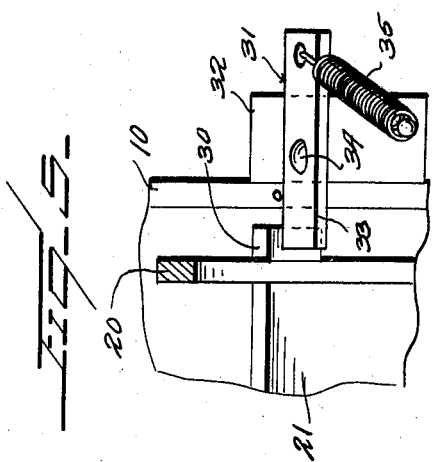
Inventor
M. R. Jeffrey
By Watson E. Coleman
Attorney Patented May 12, 1931

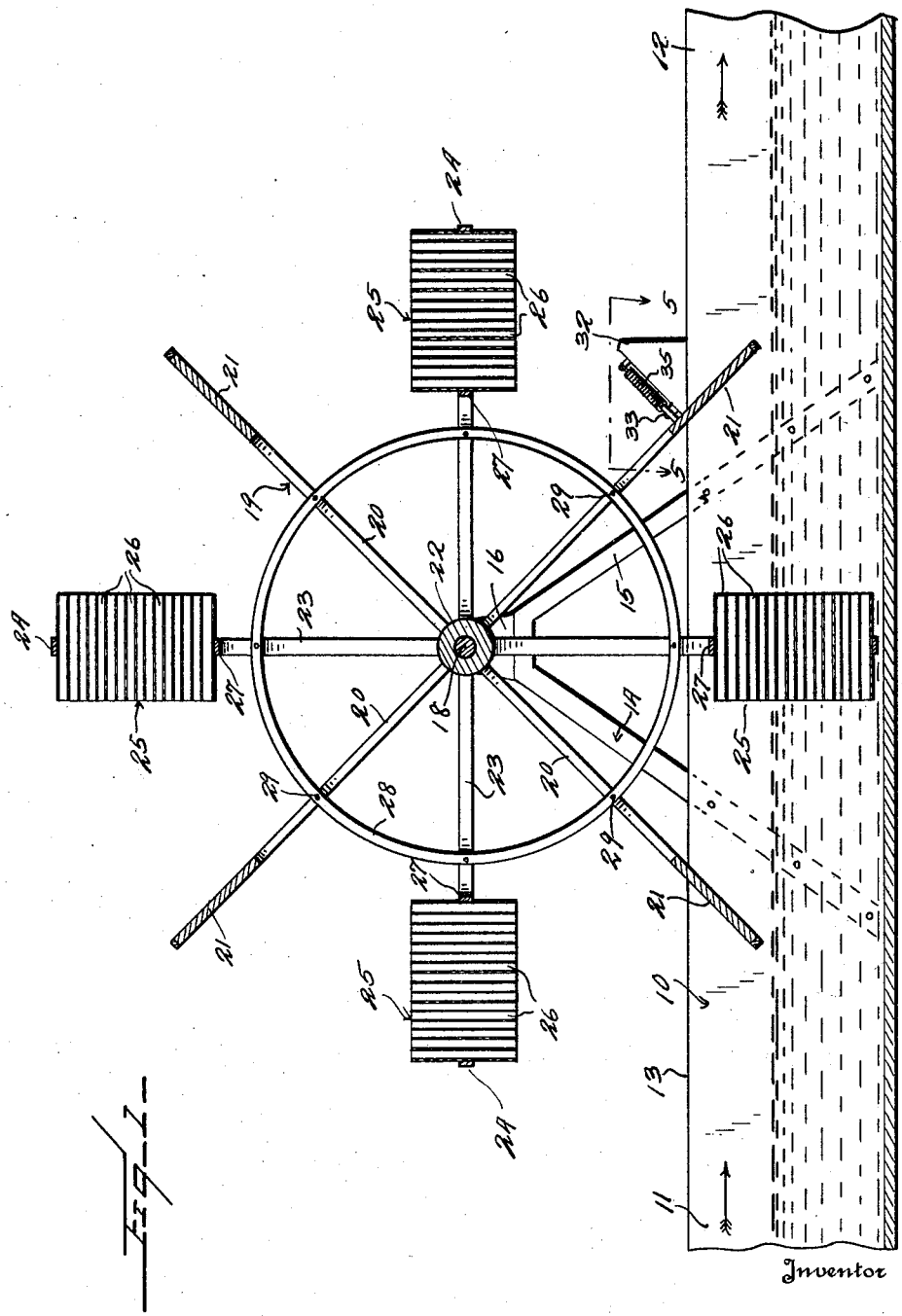

1,804,989

UNITED STATES PATENT OFFICE

MELVIN R. JEFFREY, OF MISSOULA, MONTANA

FISH CONTROL APPARATUS

Application filed March 6, 1930. Serial No. 433,743.

The present invention relates to improvements in fish control apparatus and more particularly to means for preventing the entrance of fish into irrigation canals or the like.

An object of this invention is to provide a rotatable wheel which is adapted to be mounted in a flume or the like and which is so constructed that water current will rotate the wheel upon its standard, the wheel having screening members which are adapted to be positioned in the flume and which, when so positioned, will prevent any fish from passing into the irrigation canal.

Another object of this invention is to provide in a water wheel of this character means for cleaning the screening members upon rotation of the wheel.

A further object of this invention is to provide a water wheel having a plurality of tubular screening members which will prevent any grass or other material from becoming wrapped around the screening members and which will facilitate cleaning of the screening members upon rotation of the wheel.

A still further object of this invention is to provide means for holding the screening portion of the wheel in the body of water and when a quantity of material collects in front of the tubular portion of the wheel so as to prevent free passage of the water, the wheel will be permitted to rotate so as to swing another screening member into position, the screening member which was clogged by débris, rising out of the water and being automatically cleaned through drainage of the water from the tubular screening members.

The above and various other objects and advantages of this invention will in part be described in and in part be understood from the following detailed description of the present preferred embodiment, the same being illustrated in the accompanying drawings wherein:—

Figure 1 is a longitudinal section taken through a device constructed according to the preferred embodiment of this invention;

Figure 2 is a transverse section partly in detail of the device;

Figure 3 is a fragmentary end elevation of the screen member;

Figure 4 is a fragmentary sectional view taken on the line 4—4 of Figure 3; and

Figure 5 is a view taken on the line 5—5 of Figure 1.

Referring to the drawings wherein like numerals of reference designate corresponding parts throughout the several views, the numeral 10 designates a water flume which is preferably open at the upper portion thereof, the water flume being of a character conventionally used in irrigated districts, the water flume having an inlet portion 11 and an outlet 12, the water being adapted to flow by gravity through the flume. The upper portion of the flume 10 may be constructed in the form of a ditch or the like depending only upon the conditions under which the water is adapted to be conveyed to the irrigated districts.

A frame or standard generally designated as 14 is positioned upon the opposite sides of the flume 10, the standard 14 having a plurality of angularly inclined leg members 15 which are mounted in converging relation, and an upstanding bearing 16 is positioned upon the upper end portion of the legs 15, the bearing member 16 having an annular opening 17 for rotatably receiving a shaft 18 or the like.

A fish control wheel generally designated as 19 is secured to the shaft 18 and is positioned between the upright frame or leg members 15 and extends downwardly into the flume 10. The wheel member 19 is provided with a plurality of radially inclined spaced ribs or arms 20 and paddle members 21 are positioned between pairs of the ribs 20, the paddle members 21 being preferably of substantially solid construction.

It is, of course understood that any number of paddle members 21 and pairs of ribs 20 may be positioned about the shaft 18, the number of paddles 21 depending only upon the size of the wheel to be used in a particular flume. If desired, the ribs or spokes 20 may be secured to a hub 22 which is positioned on the shaft 18.

A second series of pairs of radially inclined spoke members 23 are secured to the hub 22 and are positioned between alternate spoke members 20, the spoke members 23 being preferably substantially longer than the spoke members 20. The spoke members 23 are preferably of substantially U-shaped construction having the closed end 24 positioned on the periphery of the wheel.

A tubular screening member generally designated as 25 is secured between pairs of spoke members 23 and extends inwardly from the outer end portions thereof. The tubular screening member 25 is preferably constructed in substantially rectangular form, the particular configuration of the screening member 25 being of course dependent upon the particular configuration of the flume 10.

In the preferred embodiment of this invention, the flume 10 has been disclosed as being of substantially rectangular form having the upper portion 13 thereof open, and in like manner, the screening member 25 is disclosed as being of similar rectangular construction having a length substantially equal to the size of the flume 10 but, of course, being sufficiently smaller so that it can freely rotate within the flume.

The height of the screening member 25 is preferably substantially equal to the depth of the flume so that all of the water passing through the flume must pass through the screening member 25. The screening member 25 is preferably constructed of a plurality of rectangular or squared tubular members 26 which are preferably elongated in construction and open at the opposite ends thereof.

The water in the flume is adapted to pass through the tubular screening members 26, the size of the tubular members 26 being sufficient to permit the water to pass freely therethrough but at the same time prevent any moss or débris of any kind from passing therethrough.

The screening member 25 may be secured to the spoke members 23 in any desired manner, and preferably a bracing or clamping member 27 is positioned against the inner edge portion of the screening member 25 and is adapted to hold the screening member against the outer transverse bar or member 24.

A pair of annular ring members 28 are secured to the spoke members 20 and 23 by means of bolts or rivets 29 or the like, or if desired, by means of welding and are adapted to maintain the paddle members 21 and the screening members 25 in desired spaced relation about the hub 22.

Each of the spoke members 20 on one side of the wheel 19 is provided with outstanding lugs 30 or the like, and a tensioned stop member 31 is positioned on the flume 10 and in the path of the outstanding lug members 30, the tensioned stop member 31 being adapted to hold the wheel 19 against rotation until sufficient pressure has accumulated to rotate the wheel 19 against the tension of the stop or holding member 31.

The tensioned stop member 31 preferably comprises a block or support 32 and a swinging stop member 33 which is secured to the support 32 by means of a pivotal member 34. A spring or tensioned member 35 is secured at one end to the support 32 and at the opposite end is secured to the swinging stop member 33.

In the use of this device, the standard or wheel supporting member 14 is positioned upon the opposite sides of the flume 10 and the wheel 19 is rotatably mounted on the bearing support 16. If desired, the bearing 16 may have frictionless bearing members 36 in the form of conventional ball bearings or roller bearings. The support 32 is mounted on the flume in a position where the swinging stop member 33 will be in the path of the outstanding lugs 30.

The wheel 19 is positioned within the flume so that it will easily rotate therein and, if desired, the standard and bearing support 16 may be provided with adjustable means so that the wheel may be suitably adjusted within the flume so that the screening member 25 will readily rotate within the flume.

The screening member 25 is preferably positioned in substantially vertical position within the flume and one or more of the paddle members 21 may be slightly in contact with the water in the flume, but it will of course be understood that the tension of the stop member 31 is sufficient to hold the screening member 25 in desired position within the flume.

When the inlet portion of the tubular members 26 of the screening member 25 becomes clogged by moss or other matter, a considerable pressure will be exerted on the screening member which, taken in combination with the pressure on the paddle members 21 which may be positioned in the water in the flume, will force the rotation of the wheel against the tension of the stop member 31 and the restricted paddle members 21 will rotate the wheel 19 until another screening member 25 comes into substantially vertical position within the flume, the screening member 25 which was positioned within the flume being swung out of engagement therewith; and the water which remains within the tubular members 26 will drain outwardly from the inlet side thereof and this draining operation will force the obstructing moss, grass or the like away from the face of the screening member.

It will be obvious from the foregoing that sufficient obstruction will be at all times maintained within the flume so as to prevent any fish or the like from getting past the screening member 25. Preferably, the rotatable fish control member 19 is positioned at a point closely adjacent the large body of water which is used as a means of irrigating the district and wherein there is usually found a considerable number of fish of various kinds which it is desired to retain in natural water courses. However, if desired, the fish control member 19 may be positioned at any point along the flume 10 and be used to prevent passage of any fish which may get past the fish screening members at the head of the canal.

It will, of course, be understood that various changes and modifications may be made in the details of construction and design of the above specifically described embodiment of the invention without departing from the spirit thereof, such changes and modifications being restricted only by the scope of the following claims.

What is claimed is:—

1. A fish control wheel of the character described comprising a standard and a wheel member rotatably mounted on the standard and adapted to be positioned in a flume, said wheel comprising a plurality of radially inclined paddle members, and a plurality of tubular screening members alternately positioned between said paddle members and adapted for rotation therewith, said screening members when clogged at the forward end thereof being adapted to be rotated rearwardly by pressure of the water at the forward end thereof into a substantially horizontal cleaning position.

2. A fish control wheel of the character described comprising a standard and a fish control wheel rotatably mounted on the standard, said wheel comprising a plurality of radially inclined paddle members, a plurality of tubular screen members adapted for rotation with said paddle members, and stop means for holding said screen members within the flume, said screening members when clogged at the forward end thereof being adapted to be rotated rearwardly by pressure of the water at the forward end thereof into a substantially horizontal cleaning position.

3. A fish control wheel of the character described comprising a standard, a wheel rotatably mounted on the standard, said wheel comprising a plurality of relatively short paddle members and a plurality of elongated tubular screen members alternately positioned between said paddle members, and adapted for rotation therewith, and tensioned stop means for holding said screen members within the flume, said screening members when clogged at the forward end thereof being adapted to be rotated rearwardly by pressure of the water at the forward end thereof into a substantially horizontal cleaning position.

4. A fish control wheel of the character described comprising a support, a wheel rotatably mounted on said support, said wheel comprising a plurality of radially inclined paddle members, a plurality of radially inclined screen members, said screen members comprising a rectangular tubular screen adapted to be positioned within the flume and adapted for rotation with said paddle members, and tensioned stop means for holding said screen members in substantially vertical position within the flume, said screening members when clogged at the forward end thereof being adapted to be rotated rearwardly by pressure of the water at the forward end thereof into a substantially horizontal cleaning position.

5. A fish control wheel of the character described comprising a frame, a rotatable member adapted for rotation within a flume, said rotatable member comprising a plurality of restricted paddle members and a plurality of screen members adapted for rotation therewith, said screen members comprising a plurality of elongated tubular members adapted to be positioned within a flume, said tubular members having open opposite end portions thereof whereby to permit free passage of water therethrough, and tensioned stop means mounted on the flume and engaging said wheel whereby to hold said screen members in substantially vertical position within the flume against the tension of the water passing therethrough, said paddle members cooperating with said screen member when said screen member becomes clogged whereby to rotate said wheel in the direction of the current against the tension of said tensioned stop member, said clogged screen member when rotated out of engagement with the liquid in the flume being cleaned by downward flow of the liquid lifted upwardly by said clogged screen member.

6. A fish control wheel of the character described comprising a frame, a wheel adapted to be rotatably mounted on said frame and depending into a flume, said wheel comprising a plurality of restricted paddle members and a plurality of screen members alternately positioned between said paddle members, said screen members comprising a plurality of elongated open ended tubular members, and tensioned holding means for holding said screen members in said flume, said screen members when clogged at the forward end thereof cooperating with said paddle members whereby to rotate said wheel against the tension of said holding member, said clogged screen member being adapted to be moved rearwardly by pressure of the water on the forward end thereof and when swung out of engagement with said flume being adapted to be gravitatingly drained and cleaned.

7. A fish control device of the character described comprising a frame, a wheel rotatably mounted on said frame, said wheel comprising a hub portion, a plurality of paddle members secured to said hub and radially inclined therefrom, a plurality of tubular elongated screen members secured to said hub and alternately positioned between said paddle members, a pair of ring members concentrically positioned about said hub and secured to the opposite edges of said paddle members and said screen members and adapted to hold said paddle members and said screen members in spaced relation from each other, an outstanding lug secured to each of said paddle members on one edge thereof, and tensioned stop means adapted to engage said lugs for holding said wheel against rotation, one of said screen members being adapted to be positioned in the flume upon engagement of an outstanding lug with said tensioned stop member.

In testimony whereof I hereunto affix my signature.

MELVIN R. JEFFREY.